United States Patent [19]
Toyohara

[11] Patent Number: 5,953,470
[45] Date of Patent: Sep. 14, 1999

[54] CIRCUIT FOR OPTICAL WDM SYSTEM

[75] Inventor: Atsushi Toyohara, Tokyo, Japan

[73] Assignee: NEC Corporation, Tokyo, Japan

[21] Appl. No.: 08/982,474

[22] Filed: Dec. 2, 1997

[30] Foreign Application Priority Data

Dec. 3, 1996 [JP] Japan ..................................... 8-322458

[51] Int. Cl.⁶ .............................. G02B 6/28; G02B 6/293
[52] U.S. Cl. ................................. 385/24; 385/15; 359/127
[58] Field of Search ........................ 385/15, 24; 359/127, 359/130

[56] References Cited

U.S. PATENT DOCUMENTS

| | | | |
|---|---|---|---|
| 5,440,416 | 8/1995 | Cohen et al. ............................ | 359/127 |
| 5,751,456 | 5/1998 | Koonen .................................... | 359/127 |
| 5,793,507 | 8/1998 | Giles et al. .............................. | 359/125 |
| 5,822,095 | 10/1998 | Taga et al. ............................... | 359/127 |

OTHER PUBLICATIONS

T. Miyakawa, et al., "Suppression of Cross–Talk Penalty in Optical ADM by High Speed Polarization Scrambler", Lett., 5, pp. 304–306, 1993.

M. Miyachi, et al., "A Study on Wavelength Deviation in Optical ADM Network", Toshiba Corp. R&D Center, 1996.

*Primary Examiner*—John D. Lee
*Assistant Examiner*—Victoria D. Hao
*Attorney, Agent, or Firm*—Whitman, Curtis & Whitman

[57] ABSTRACT

A WDM optical circuit includes an optical circulator having a first path from a first port to a second port and a second path from the second port to a third port. The optical WDM signals received from the second port of the optical circulator are separated out by a WDM coupler on wavelengths, respectively. One of the optical signals on a selected wavelength is dropped and a new signal is added on the same wavelength by an optical transceiver.

20 Claims, 7 Drawing Sheets

CIRCUIT FOR OPTICAL WDM SYSTEM

BACKGROUND OF THE INVENTION

1. Field of the Invention

The present invention generally relates to a circuit for an optical Wavelength-Division Multiplexing (WDM) system, and in particular to an optical circuit such as a wavelength Add/Drop multiplexer and an optical WDM network including the same.

2. Description of the Related Art

Wavelength-Division Multiplexing abbreviated as WDM is the current favorite multiplexing technology for optical communication networks. In such an optical WDM communications network, a wavelength Add/Drop circuit is needed to drop the optical signal on a predetermined wavelength and add a new data stream to the same wavelength at the location thereof.

A conventional Add/Drop circuit has been proposed by Miyakawa et al. in an article "Suppression of cross talk penalty in optical ADM by high speed polarization scrambler" (B-1087, a publication of the communications society of IEICE, 1996). The Add/Drop circuit inserted on a physical fiber link is composed of two optical circulators connected in cascade and two wavelength filters which are connected to the optical circulators, respectively. A first combination of the first circulator and the first filter is used to drop an optical signal on the corresponding wavelength of the first filter and a second combination is used to add a new optical signal to the same wavelength.

Another conventional Add/Drop circuit has been proposed by Miyaji et al. in an article "A study on wavelength variation in optical ADM network" (B-1086, a publication of the communications society of IEICE, 1996). The Add/Drop circuit is composed of a WDM coupler as a demultiplexer, one switch per wavelength, and another WDM coupler as a multiplexer. If one of the switches is opened, the signal on the corresponding wavelength is dropped locally and a new signal is added to the same wavelength at this Add/drop circuit.

However, in the case where a plurality of wavelengths are dropped and added, the former circuit needs two circulators and two filters for each wavelength, resulting in increased amount of hardware. In the latter circuit, since two WDM couplers are needed, it is difficult to make the size of the circuit small, especially in the case of a large number of wavelengths.

SUMMARY OF THE INVENTION

An object of the present invention is to provide an optical circuit for WDM network applications with reduced size and simplified circuit configuration.

Another object of the present invention is to provide an optical circuit which can achieve an add/drop function with reduced size and simplified circuit configuration.

Still another object of the present invention is to provide an optical circuit for WDM network applications which can achieve the fine adjustment of transmission levels.

According to an aspect of the present invention, there is provided a guide having a first path from a first port to a second port and a second path from the second port to a third port, and a coupler having a single port optically connected to the second port of the guide and a plurality of ports each corresponding to a different wavelength, wherein each of the ports is optically connected to one of an optical reflector and an optical transceiver.

According to another aspect of the present invention, in addition to the guide and the coupler, there is provided at least one optical variable attenuator which is optically connected to at least one of the ports.

Further, according to the present invention, when receiving a plurality of input optical signals each having a different wavelength on a transmission line, they are separated on wavelengths, respectively, and then a selected one thereof on a predetermined wavelength is dropped. Further, input optical signals other than the selected one are reflected and a transmission signal on the predetermined wavelength is added to the input optical signals reflected to produce a plurality of output optical signals on the wavelengths, respectively. The output optical signals are transmitted onto the transmission line.

DETAILED DESCRIPTION OF THE PREFERRED EMBODIMENTS

Figure 1:
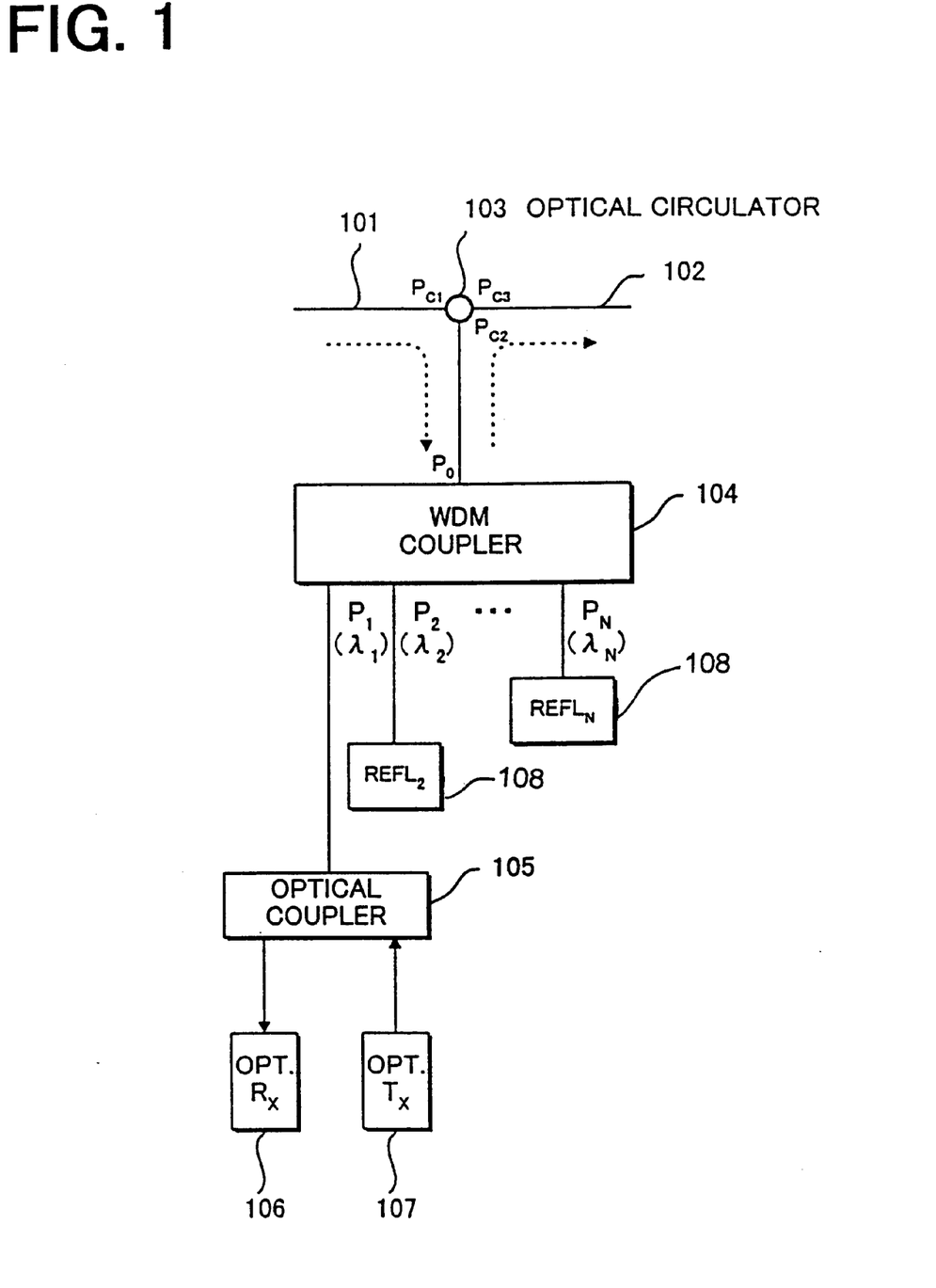
FIG. 1 is a block diagram showing a wavelength Add/Drop circuit according to a first embodiment of the present invention.

Referring to FIG. 1, there is shown a wavelength Add/Drop circuit which is inserted between transmission lines 101 and 102 forming a physical fiber link through which the respective optical WDM signals on N wavelengths $\lambda_1$–$\lambda_N$ are transmitted, where N is an integer greater than 1. The wavelength Add/Drop circuit is comprised of an optical circulator 103 having three ports $P_{C1}$, $P_{C2}$ and $P_{C3}$ and a WDM coupler 104 having a single port $P_0$ and N ports $P_1$–$P_N$. The second port $P_{C2}$ of the optical circulator 103 is optically connected to the single port $P_0$ of the WDM coupler 104.

When the optical circulator 103 receives input optical WDM signals at the first port $P_{C1}$ from the transmission line 101, the input optical WDM signals appear on the second port $P_{C2}$ and are output to the WDM coupler 104. When output optical WDM signals are received at the second port $P_{C2}$ from the WDM coupler 104, they appear on the third port $P_{C3}$ and are output to the transmission line 102.

The WDM coupler 104 receives the input optical WDM signals from the first port $P_{C1}$ of the optical circulator 103 and separates out N optical signals on N wavelengths $\lambda_1$–$\lambda_N$ which appear on the N ports $P_1$–$P_N$, respectively. Contrarily, when receiving N optical signals at the N ports $P_1$–$P_N$, respectively, the WDM coupler 104 combines and sends them from the single port $P_0$ to the optical circulator 103.

Preferably, the WDM coupler 104 may be comprised of AWG (arrayed waveguide grating) WDM coupler.

Each of the N ports $P_1$–$P_N$ of the WDM coupler 104 can be optically connected to either an optical transceiver or an optical reflector. In this embodiment, the first port $P_1$ is connected to the optical transceiver and the other ports $P_1$–$P_N$ are optically connected to N–1 optical reflectors 108, respectively. The respective optical signals appearing on the ports $P_2$–$P_N$ are reflected by the optical reflectors $REFL_2$–$REFL_N$ and the reflected optical signals are sent back to the corresponding ports $P_2$–$P_N$ of the WDM coupler 104. Therefore, a desired wavelength signal can be dropped and added depending on which port is connected to the optical transceiver. A plurality of optical transceivers may be connected to the corresponding ports of the WDM coupler 104, respectively.

The optical transceiver is comprised of an optical coupler 105, an optical receiver 106 and an optical transmitter 107. The first port of the optical coupler 105 is optically connected to the first port $P_1$ of the WDM coupler 104 and the second and third ports of the optical coupler 105 are optically connected to the optical receiver 106 and the optical transmitter 107, respectively. An optical circulator may be used to perform the same function as the optical coupler 105.

In the above circuit configuration, the input optical WDM signals are input to the port $P_0$ of the WDM coupler 104 through the optical circulator 103. The WDM coupler 104 separates out the N optical signals each on a unique wavelength. The optical signal on the wavelength $\lambda_1$ which appears on the port $P_1$ is transferred to the optical receiver 106 through the optical coupler 105. The other optical signals on the wavelengths $\lambda_2$–$\lambda_N$ are reflected from the reflectors $REFL_2$–$REFL_N$ to the corresponding ports $P_2$–$P_N$, respectively. When the optical transmitter 107 outputs an optical signal of the corresponding wavelength $\lambda_1$, it is transferred to the port $P_1$ of the WDM coupler 104 through the optical coupler 105. The WDM coupler 104 combines the optical signal on the wavelength $\lambda_1$ and the other optical signals on the wavelengths $\lambda_2$–$\lambda_N$ to output them to the port $P_{C2}$ of the optical circulator 103. In other words, the optical signal on the wavelength $\lambda_1$ traveling through the optical fiber link is dropped and a new optical signal is added on the same wavelength $\lambda_1$ at the location of the wavelength Add/Drop circuit.

As shown in FIGS. 2–5, an optical variable attenuator can be used to finely adjust the intensity of optical signal for each wavelength. In FIGS. 2–5, circuit blocks similar to those previously described with reference to FIG. 1 are denoted by the same reference numerals and the details thereof are omitted.

Figure 2:
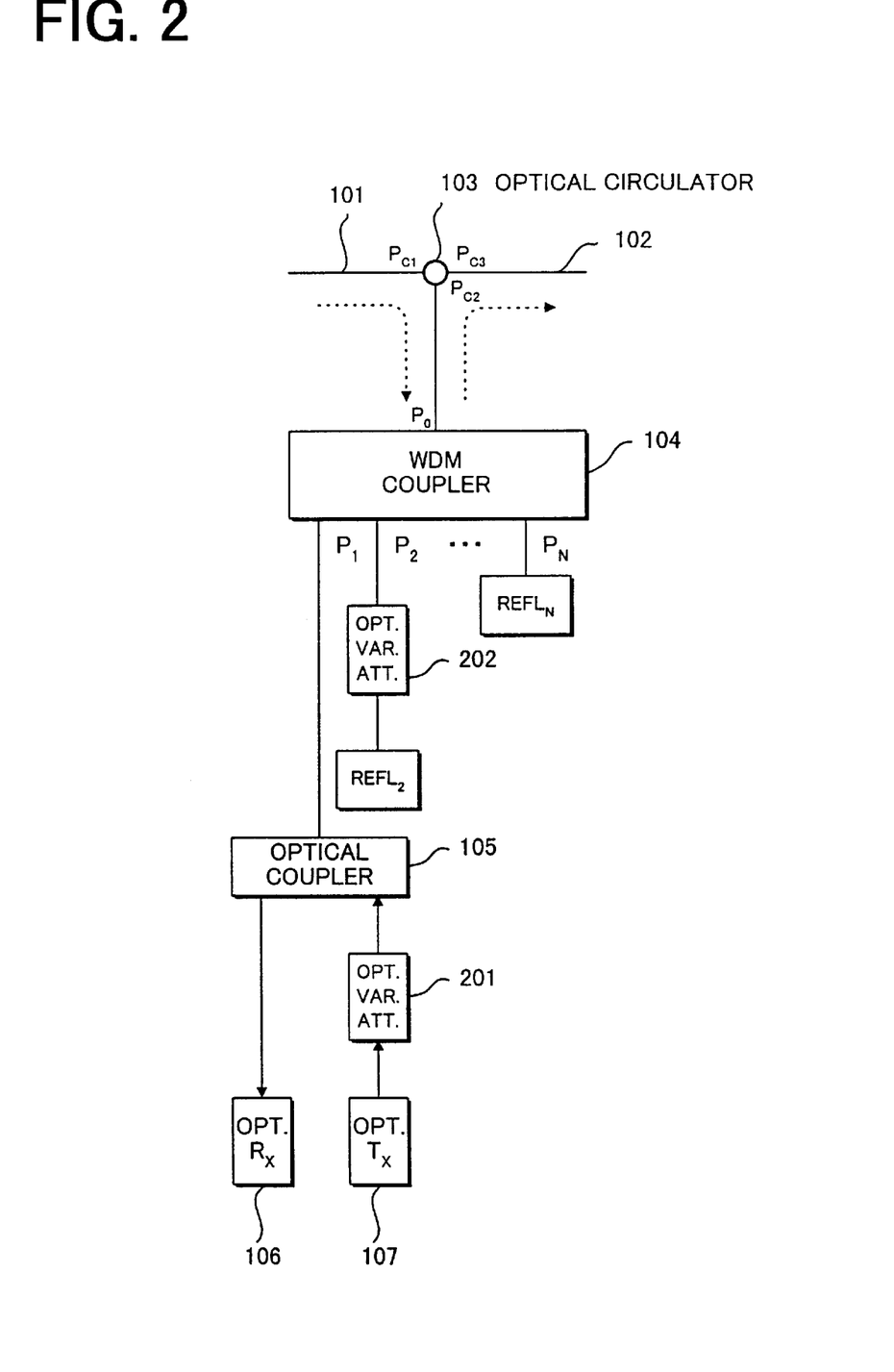
FIG. 2 is a block diagram showing a first example of a wavelength Add/Drop circuit according to a second embodiment of the present invention.

Referring to FIG. 2, an optical variable attenuator 201 is connected between the optical coupler 105 and the optical transmitter 107 and further an optical variable attenuator 202 is connected between the port $P_2$ of the WDM coupler 104 and the optical reflector $REFL_2$. Therefore, the respective transmission light intensities of optical signals on the wavelengths $\lambda_1$ and $\lambda_2$ can be adjusted by the optical variable attenuators 201 and 202, respectively.

Figure 3:
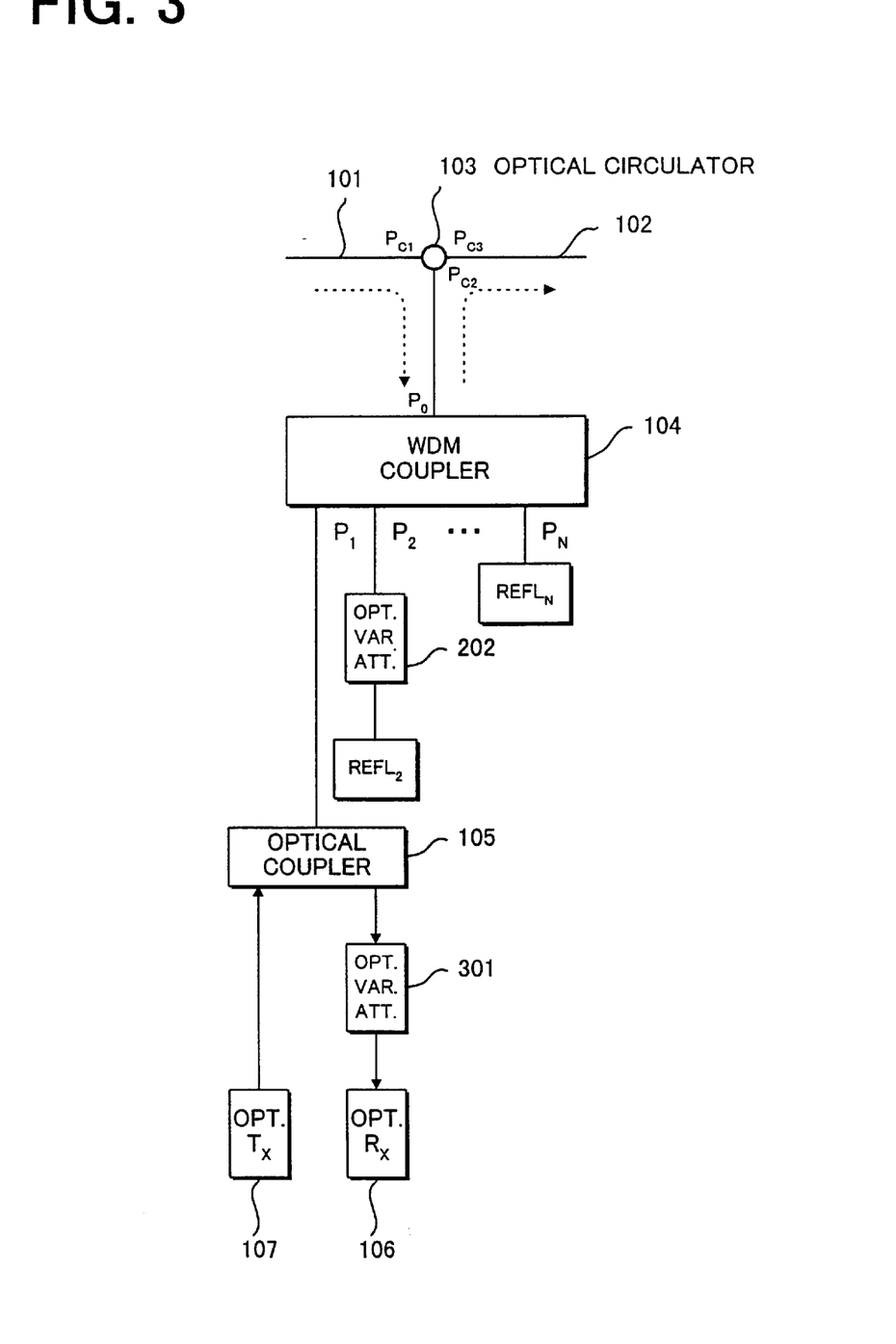
FIG. 3 is a block diagram showing a second example of the wavelength Add/Drop circuit according to the second embodiment of the present invention.

Referring to FIG. 3, an optical variable attenuator 301 is connected between the optical coupler 105 and the optical receiver 106 and the optical variable attenuator 202 is connected between the port $P_2$ of the WDM coupler 104 and the optical reflector $REFL_2$. Therefore, the received light intensity of the optical signal on the wavelength $\lambda_1$ can be adjusted by the optical variable attenuator 301 and further the transmission light intensity of the optical signal on the wavelength $\lambda_2$ can be also adjusted by the optical variable attenuator 202.

Figure 4:
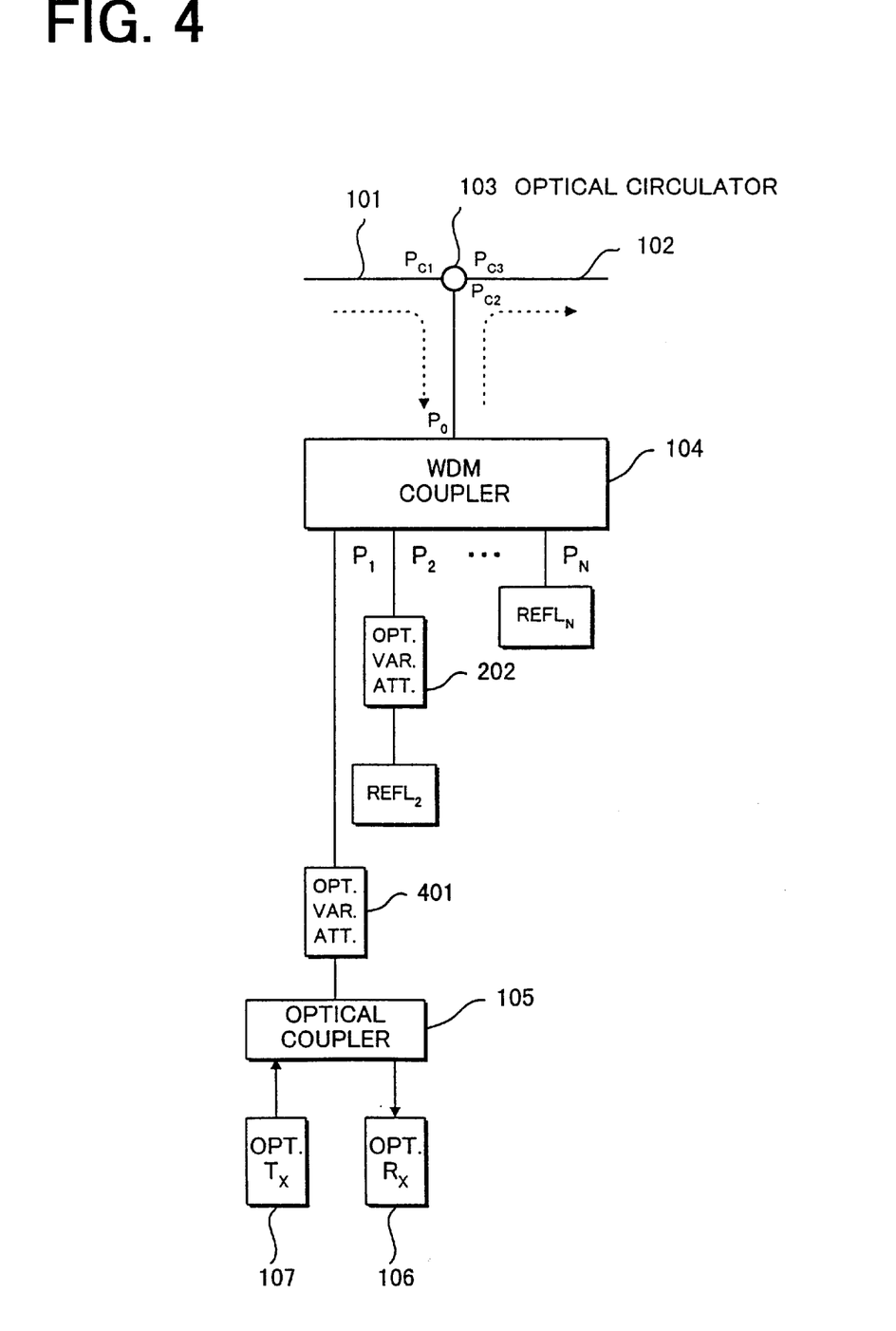
FIG. 4 is a block diagram showing a third example of the wavelength Add/Drop circuit according to the second embodiment of the present invention.

Referring to FIG. 4, an optical variable attenuator 401 is connected between the port $P_1$ of the WDM coupler 104 and the optical coupler 105 and further the optical variable attenuator 202 is connected between the port $P_2$ of the WDM coupler 104 and the optical reflector $REFL_2$. Therefore, the transmission and reception light intensities of optical signals on the wavelength $\lambda_1$ can be adjusted by the optical variable attenuator 401 and further the transmission light intensity of the optical signal on the wavelength $\lambda_2$ can be also adjusted by the optical variable attenuator 202.

Figure 5:
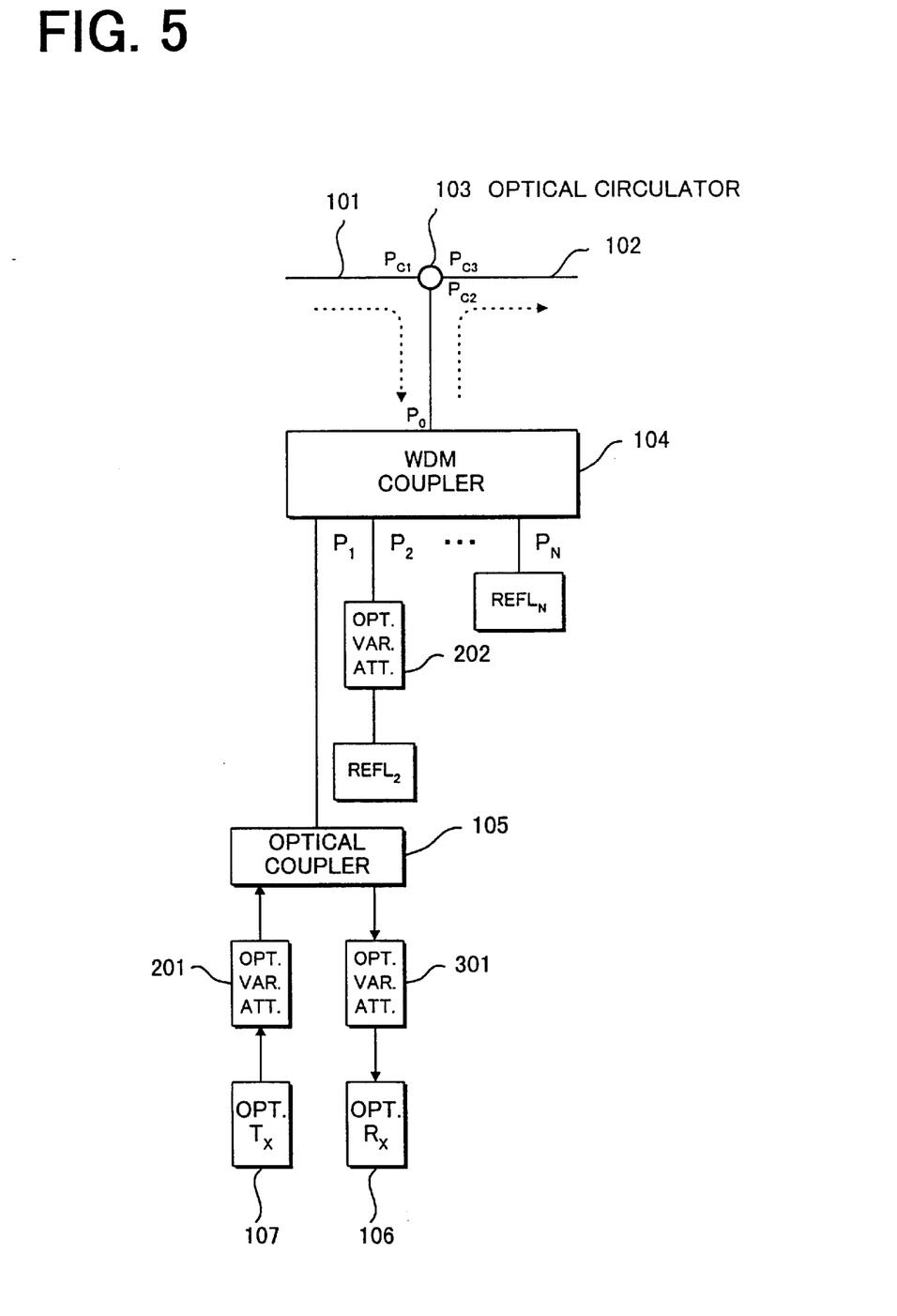
FIG. 5 is a block diagram showing a fourth example of the wavelength Add/Drop circuit according to the second embodiment of the present invention.

Referring to FIG. 5, an optical variable attenuator 201 is connected between the optical coupler 105 and the optical transmitter 107, an optical variable attenuator 301 is connected between the optical coupler 105 and the optical receiver 106, and further the optical variable attenuator 202 is connected between the port $P_2$ of the WDM coupler 104 and the optical reflector $REFL_2$. Therefore, the respective transmission light intensities of optical signals on the wavelengths $\lambda_1$ and $\lambda_2$ can be adjusted by the optical variable attenuators 201 and 202, respectively. Further, the received light intensity of the optical signal on the wavelength $\lambda_1$ can be adjusted by the optical variable attenuator 301.

The present invention cannot be limited to the examples as shown in FIGS. 2–5. An optical variable attenuator may be provided between a selected port of the WDM coupler 104 and an optical transceiver. Alternatively, an optical variable attenuator can be provided between at least one of the optical receiver 106 and the optical transmitter 107 and the optical coupler 105 in the optical transceiver. An optical variable attenuator may be further provided between any optical reflector and the corresponding port of the WDM coupler 104.

Figure 7:
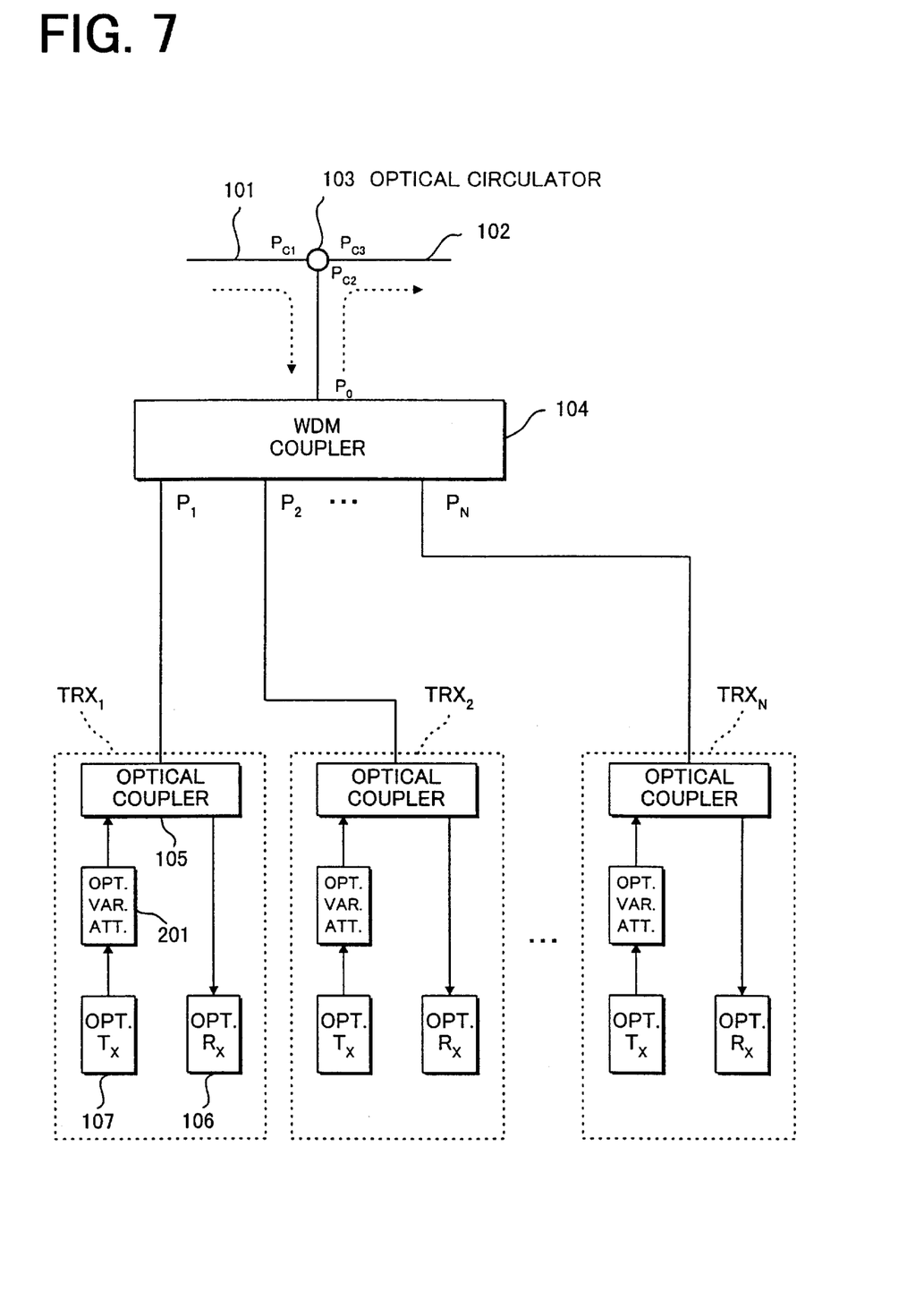
FIG. 7 is a block diagram showing a fifth example of the wavelength Add/Drop circuit according to the second embodiment of the present invention.

Further, the ports $P_1$–$P_N$ of the WDM coupler 104 are preferable coupled to optical transceivers $TRX_1$–$TRX_N$, respectively, as shown in FIG. 7.

Figure 6:
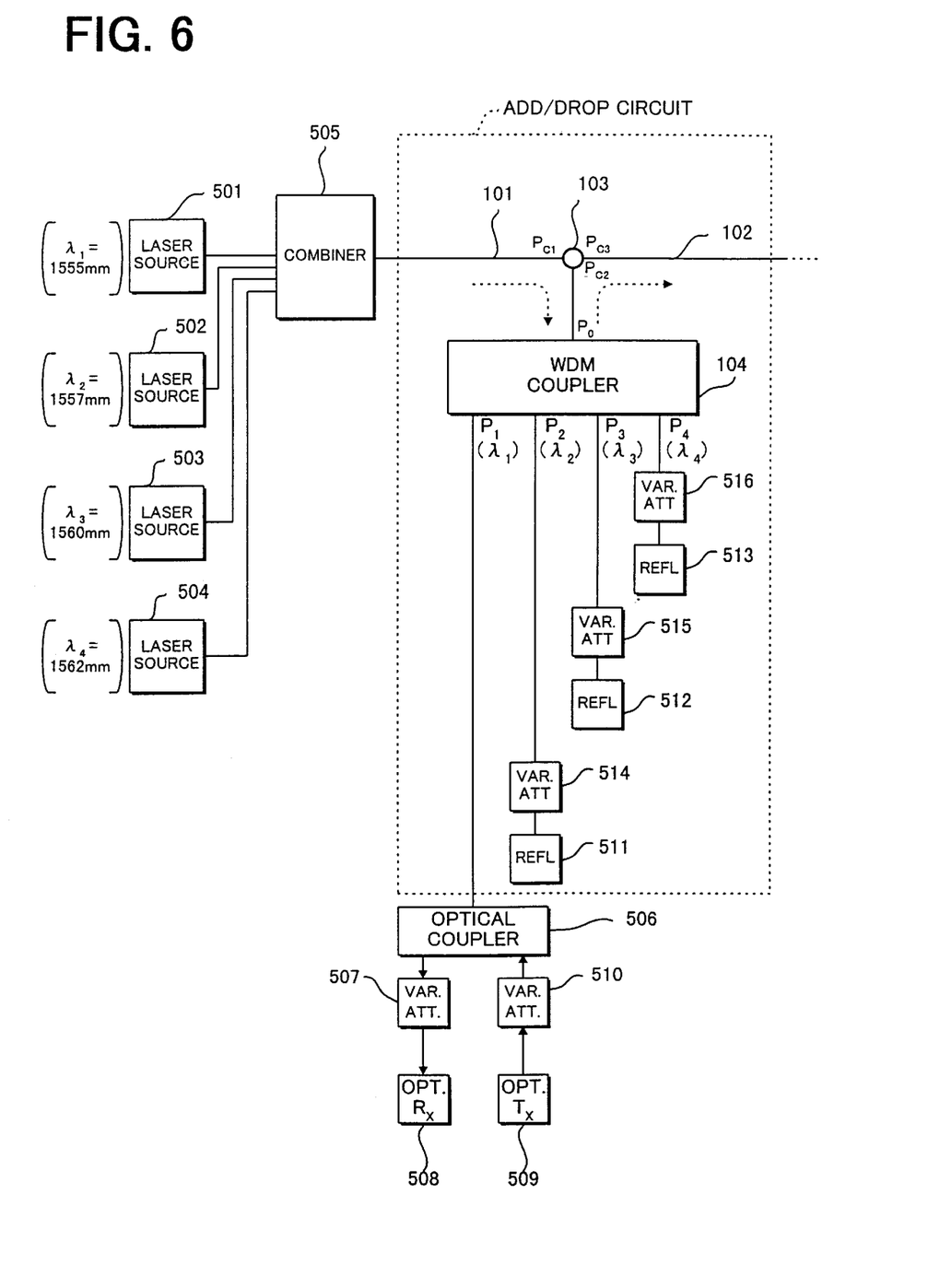
FIG. 6 is a block diagram showing an optical WDM network according to the present invention.

Referring to FIG. 6, there are provided laser sources 501–504 producing laser beams having different wavelengths, for example, $\lambda_1$=1555 nm, $\lambda_2$=1557 nm, $\lambda_3$=1560 nm and $\lambda_4$=1562 nm, respectively. A combiner 505 combines the wavelengths on the optical fiber 101.

An wavelength Add/Drop circuit is inserted between the optical fibers 101 and 102 through which the respective optical WDM signals on four wavelengths $\lambda_1$–$\lambda_4$ are transmitted. The wavelength Add/Drop circuit is comprised of the optical circulator 103 having three ports $P_{C1}$, $P_{C2}$ and $P_{C3}$ and the WDM coupler 104 having the single port $P_0$ and the four ports $P_1$–$P_4$. The second port $P_{C2}$ of the optical circulator 103 is optically connected to the single port $P_0$ of the WDM coupler 104.

When the optical circulator 103 receives input optical WDM signals at the first port $P_{C1}$, the input optical WDM signals appear on the second port $P_{C2}$ and are output to the WDM coupler 104. When output optical WDM signals are received at the second port $P_{C2}$ from the WDM coupler 104, they appear on the third port $P_{C3}$ and are output to the transmission line 102.

The WDM coupler 104 receives the input optical WDM signals from the first port $P_{C1}$ of the optical circulator 103 and separates out four optical signals on four wavelengths $\lambda_1$–$\lambda_4$ which appear on the four ports $P_1$–$P_4$, respectively. Contrarily, when receiving four optical signals at the four ports $P_1$–$P_4$, respectively, the WDM coupler 104 combines and sends them from the single port $P_0$ to the optical circulator 103. The WDM coupler 104 is comprised of crystal waveguides arranged in AWG.

The first port $P_1$ of the WDM coupler 104 is optically connected to the first port of an optical coupler 506. The second port of the optical coupler 506 is optically connected to an optical receiver 508 through an optical variable attenuator 507. The third port of the optical coupler 506 is optically connected to an optical transmitter 509 through an optical variable attenuator 510. The optical transmitter 509 outputs an optical signal having a wavelength of 1555.2 nm in this embodiment. Therefore, the input optical signal on the wavelength $\lambda_1$ is dropped and received by the optical receiver 508 while the received signal level is adjusted by the optical variable attenuator 507. On the other hand, the output optical signal on approximately the same wavelength 1555.2 nm as the wavelength $\lambda_1$=1555 nm is transferred from the optical transmitter 509 to the optical fiber 102 while the light intensity thereof is adjusted by the optical variable attenuator 510.

The other ports $P_2$–$P_4$ of the WDM coupler 104 are optically connected to optical reflectors 511–513 through optical variable attenuators 514–516, respectively. Therefore, the respective optical signals appearing on the ports $P_2$–$P_4$ are reflected by the optical reflectors 511–513 and their light intensities are adjusted by the optical variable attenuators 514–516. Therefore, the input optical signals on the wavelengths $\lambda_2$–$\lambda_4$ are transferred from the optical fiber 101 to the optical fiber 102 while the light intensity on each wavelength is adjusted by the corresponding optical variable attenuator.

As described above, a wavelength Add/Drop circuit according to the present invention has a simplified circuit configuration comprising a waveguide element such as a circulator, a WDM coupler and reflectors. More than one wavelength can be easily dropped and added by connecting an optical transceiver to the corresponding port of the WDM coupler 104 instead of the optical reflector.

Further, a wavelength Add/Drop circuit as shown in FIGS. 1–5 can be used in any WDM network application. Therefore, a WDM network system can be formed by inserting at least one wavelength Add/Drop circuit according to the present invention on an optical transmission line.

What is claimed is:

1. An optical circuit comprising:
   a guide having a first path from a first port to a second port and a second path from the second port to a third port; and
   a coupler having a single port optically connected to the second port of the guide, the coupler separating out N different wavelengths and having a plurality of ports each corresponding to the N different wavelengths, each of the N different wavelengths being output from the coupler separately through each of the plurality of ports of the coupler, respectively, to one of an optical reflector and an optical transceiver which are optically connected to the plurality of ports of the coupler, the optical reflector receiving and reflecting N−1 different wavelengths, and the coupler combining one of the N−1 different reflected wavelengths and a new signal on a selected different wavelength received from the transceiver and transmitting the combined wavelength through the single port to the second port.

2. The optical circuit according to claim 1, wherein the coupler receives a plurality of first optical signals on different wavelengths at the single port from the second port of the guide and separates out the first optical signals which appear on the plurality of ports of the coupler, respectively, and the coupler receives a plurality of second optical signals at the plurality of ports of the coupler, respectively, and combines the second optical signals to send them to the second port of the guide.

3. The optical circuit according to claim 1, wherein one of the plurality of ports of the coupler corresponding to a predetermined wavelength is optically connected to the optical transceiver and the other of the plurality of ports of the coupler are optically connected to optical reflectors, respectively.

4. The optical circuit according to claim 1, wherein the guide is an optical circulator and the coupler is a wavelength-division multiplexing (WDM) coupler.

5. The optical circuit according to claim 4, wherein the WDM coupler comprises a plurality of crystal waveguides arranged in arrayed waveguide grating.

6. An optical communications system comprising at least one optical circuit according to claim 1.

7. An optical circuit comprising:
   a guide having a first path from a first port to a second port and a second path from the second port to a third port;
   a coupler having a single port optically connected to the second port of the guide, the coupler separating out N different wavelengths and having a plurality of ports each corresponding to the N different wavelengths, each of the N different wavelengths being output from the coupler separately through each of the plurality of ports of the coupler, respectively, to one of an optical reflector and an optical transceiver which are optically connected to the plurality of ports of the coupler, the optical reflector receiving and reflecting N−1 different wavelengths, and the coupler combining one of the N−1 different reflected wavelengths and a new signal on a selected different wavelength from the transceiver and transmitting the combined wavelength through the single port to the second port; and
   at least one optical variable attenuator which is optically connected to at least one of the plurality of ports of the coupler.

8. The optical circuit according to claim 7, wherein the coupler receives a plurality of first optical signals on different wavelengths at the single port from the second port of the guide and separates out the first optical signals which appear on the plurality of ports of the coupler, respectively, and the coupler receives a plurality of second optical signals at the plurality of ports of the coupler, respectively, and combines the second optical signals to send them to the second port of the guide.

9. The optical circuit according to claim 7, wherein one of the plurality of ports of the coupler corresponding to a predetermined wavelength is optically connected to the optical transceiver and the other of the plurality of ports of the coupler are optically connected to optical reflectors, respectively.

10. The optical circuit according to claim 7, wherein the guide is an optical circulator and the coupler is a wavelength-division multiplexing (WDM) coupler.

11. The optical circuit according to claim 10, wherein the WDM coupler comprises a plurality of crystal waveguides arranged in arrayed waveguide grating.

12. The optical circuit according to claim 7, wherein each of the plurality of ports of the coupler is optically connected to one of the optical reflector and the optical transceiver through the optical variable attenuator.

13. The optical circuit according to claim 7, wherein at least one of the plurality of ports of the coupler is optically connected to one of the optical reflector and the optical transceiver through the optical variable attenuator.

14. The optical circuit according to claim 7, wherein the optical transceiver comprises:

an optical receiver;

an optical transmitter; and a second guide having a guide port which is optically connected to a selected one of the plurality of ports of the coupler and second and third guide ports which are optically connected to the optical receiver and the optical transmitter, respectively.

15. The optical circuit according to claim 14, wherein an optical variable attenuator is provided between a port other than a selected port and an optical reflector which is optically connected to the port; and an optical variable attenuator is provided between the second guide and one of the optical receiver and the optical transmitter.

16. The optical circuit according to claim 14, wherein an optical variable attenuator is provided between a port other than a selected port and an optical reflector which is optically connected to the port; and an optical variable attenuator is provided between the second guide and each of the optical receiver and the optical transmitter.

17. The optical circuit according to claim 14, therein the second guide comprises one of an optical coupler and an optical circulator.

18. An add/drop method for an optical signal on a predetermined wavelength, comprising the steps of:

receiving a plurality of input optical signals each having a different wavelength on a transmission line;

separating out the input optical signals on wavelengths, respectively;

transmitting the separated out input optical signals through a plurality of ports of a coupler;

dropping a selected one of the input optical signals on the predetermined wavelength;

reflecting input optical signals other than the selected one;

adding a transmission signal on the predetermined wavelength to the input optical signals reflected to produce a plurality of output optical signals on the wavelengths, respectively; and transmitting the output optical signals onto the transmission line.

19. The method according to claim 18, wherein an intensity of the selected one of the input optical signals is adjusted and at least one of intensities of input optical signals other than the selected one is adjusted.

20. The method according to claim 18, wherein an intensity of the transmission signal is adjusted and at least one of intensities of reflected input optical signals is adjusted.

* * * * *